Feb. 16, 1926.

O. A. THOMAS

BEET PULLER

Filed August 11, 1923

Patented Feb. 16, 1926.

1,573,657

UNITED STATES PATENT OFFICE.

OSCAR A. THOMAS, OF OXNARD, CALIFORNIA.

BEET PULLER.

Application filed August 11, 1923. Serial No. 656,769.

*To all whom it may concern:*

Be it known that I, OSCAR A. THOMAS, a citizen of the United States, residing at Oxnard, in the county of Ventura and State of California, have invented new and useful Improvements in Beet Pullers, of which the following is a specification.

My invention relates to beet pullers, and a purpose of my invention is the provision of an attachment for vehicles by which a tractor or similar form of vehicle can be readily converted into a device which operates to effectively pull beets or similar vegetables from the earth as the vehicle moves over the ground and to deposit the beets in order on the ground to facilitate gathering.

Although I have herein shown and will describe only one form of beet puller embodying my invention, it is to be understood that various changes and modifications may be made herein without departing from the spirit of the invention and the spirit and scope of the appended claims.

In the accompanying drawings.

Figure 1:
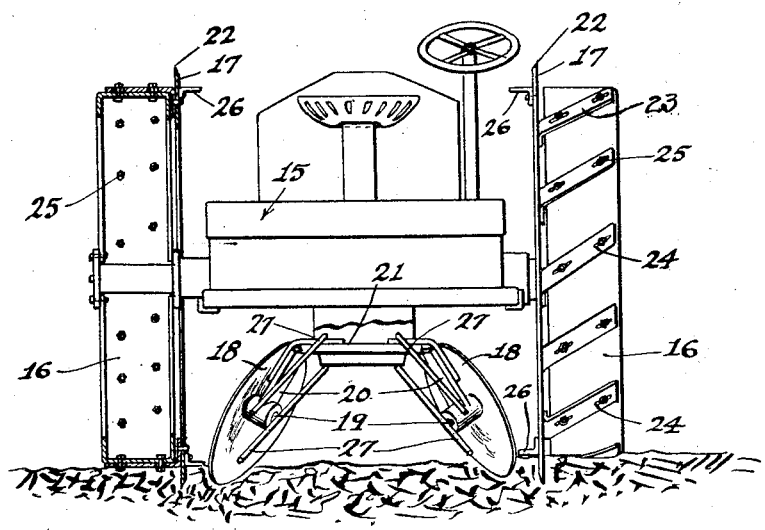
Fig. 1 is a view showing in end elevation a conventional form of tractor having applied thereto one form of beet pulling device embodying my invention.
Figure 2:
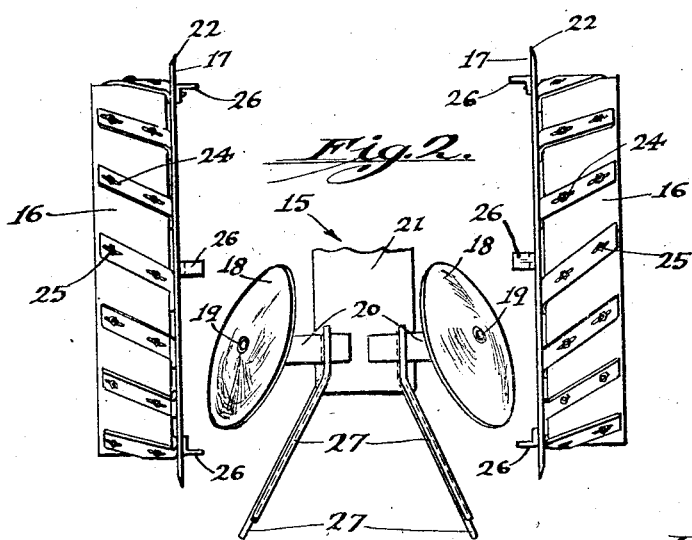
Fig. 2 is a top plan view of Fig. 1 with portions of the vehicle broken away to show the manner in which the beet pulling device is associated with the tractor.

Referring specifically to the drawings in which similar reference characters refer to similar parts, my invention in its present embodiment is shown as applied to a tractor including a chassis 15, and rear driving wheels 16. The beet pulling device forming the subject matter of my invention, comprises in the present instance a pair of elements 17 carried by the wheels 16 which are adapted to cooperate with discs 18 supported for rotational movement upon stub shafts 19 carried by brackets 20 adjustably secured to a supporting yoke 21. The supporting yoke 21 is in turn secured to the chassis 15 in any suitable manner so that the discs 18 are sustained for rotational movement between the members 17.

The members 17 are in the form of flat annuli having relatively sharp cutting edges 22 which cut into the earth during movement of the tractor. As shown, supporting brackets 23 are secured at intervals to the outer sides of the annuli, and these brackets are slotted as indicated at 24 to receive securing bolts 25 which extend through the wheels 16 of the tractor. By virtue of the slots 24, the brackets can be secured in any adjusted position to vary the position of the annuli with respect to the discs 18.

For the purpose of preventing earth from collecting between the discs and annuli and to thereby insure of the proper operation of the attachment, I provide the inner sides of the annuli with lugs or projections 26 which are circumferentially spaced about the annuli to successively pass between the discs and annuli during movement of the tractor along the ground.

It will be noted that the stub shafts 19 are supported so that the discs occupy inclined positions and converging positions with respect to each other, and each disc is in converging relation to the adjacent element 17. Each disc is of concavo-convex formation, or of the same form as embodied in my Patent No. 1,462,948, issued July 24, 1923.

In connection with the discs, I employ rods 27 arranged in pairs with one pair for each of the discs, such rods being supported upon the yoke 21 to extend rearwardly, outwardly and downwardly from the discs so as the beets are discharged from between the discs and elements 17 they will be engaged by the rods and deposited in rows at the rear of the vehicle.

In practice, the elements 17 are of such a diameter as to have their cutting edges project from the peripheries of the wheels 16 and below the discs 18. These cutting edges penetrate the earth at the points where the peripheries of the wheels contact with the earth. Likewise, the discs 18 are supported so as to normally penetrate the earth and thus co-operate with the annuli so as the vehicle moves forward strips of beet carrying earth will be cut and simultaneously lifted due to the curvature and inclination of the discs with relation to the elements 17. As these strips of earth are lifted, the beets will be freed and deposited upon the ground as the vehicle moves beyond the same, the guide rods 22 serving to deposit the beets in rows, as has been described.

It will be understood that although I have shown and described two sets of discs, guide rods and annuli, it is to be understood that the vehicle may be provided with only one set of these elements to effectively pull a single row of beets.

What I claim is:

1. A beet pulling device, comprising an annulus adapted to be secured to a vehicle wheel and having a continuous cutting edge, a convex disc arranged in converging relation to the annulus and mounted for rotational movement, and means carried by one of the elements for preventing clogging of earth between the elements.

2. A beet pulling device comprising a flat annulus having an outer cutting edge, a series of brackets secured thereto, a vehicle wheel, means to secure the brackets to the periphery of the vehicle wheel with the cutting edge of the annulus extending beyond the periphery of the wheel and a disc arranged in converging relation to the annulus and mounted for rotation of movement.

3. A beet pulling device comprising in combination a flat annulus having a continuous outer cutting edge, a series of brackets secured to the face of the disc and extending at substantially right angles thereto, a vehicle wheel, means to adjustably bolt the brackets to the periphery of the vehicle wheel whereby the annulus may be spaced at variable distances from the side of the wheel and a disc arranged in converging relation to the annulus and mounted for rotation of movement.

4. A beet pulling device as claimed in claim 3, in which the disc is convex and in which a series of angular lugs are secured to the annulus on the side opposite the brackets to prevent clogging of the earth between the annulus and the disc.

In testimony whereof I have signed my name to this specification.

OSCAR A. THOMAS.